(12) United States Patent
Vinayagamurthy et al.

(10) Patent No.: US 11,782,952 B2
(45) Date of Patent: Oct. 10, 2023

(54) AUTOMATION OF MULTI-PARTY COMPUTATION AS A SERVICE ACCORDING TO USER REGULATIONS AND REQUIREMENTS

(71) Applicant: International Business Machines Corporation, Armonk, NY (US)

(72) Inventors: Dhinakaran Vinayagamurthy, Erode (IN); Santosh Ravi Kiran Penubothula, Vijayawada (IN); Pankaj Satyanarayan Dayama, Bangalore (IN); Nitin Singh, Bangalore (IN); Abhishek Singh, Delhi (IN); Vinayaka Pandit, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/405,930

(22) Filed: Aug. 18, 2021

(65) Prior Publication Data
US 2023/0059492 A1    Feb. 23, 2023

(51) Int. Cl.
*G06F 7/00* (2006.01)
*G06F 16/27* (2019.01)
(Continued)

(52) U.S. Cl.
CPC ...... *G06F 16/278* (2019.01); *G06F 16/24565* (2019.01); *G06F 16/24573* (2019.01);
(Continued)

(58) Field of Classification Search
CPC ............. G06F 16/24565; G06F 16/252; G06F 16/278; G06F 16/24573; H04L 9/085; H04L 2209/46
(Continued)

(56) References Cited

U.S. PATENT DOCUMENTS

2020/0401715 A1    12/2020  Linton et al.
2021/0250172 A1*   8/2021   Choyi ................... H04W 12/08
2022/0121521 A1*   4/2022   Eldefrawy ............. H04L 9/085

FOREIGN PATENT DOCUMENTS

CN    109359957 A    2/2019
CN    111881487 A    11/2020
EP      3477527 A1    5/2019

OTHER PUBLICATIONS

Dumitru Roman et al., "Enabling Data Markets using Smart Contracts and Multi-Party Computation", Business Information Systems Workshops, 2019, 7 pages, SINTEF.

* cited by examiner

*Primary Examiner* — Md I Uddin
(74) *Attorney, Agent, or Firm* — Ference & Associates LLC (57) ABSTRACT

One embodiment provides a method, including: receiving, at a service provider and from a user, a request for computation of a function, wherein the request includes a description of the function to be computed and requirements of the user; identifying, from data sources accessible to the service provider, a plurality of data sources to participate in the computation in view of the requirements and the description of the function, wherein each of the plurality of data sources includes data of a data owner and constraints on use of the data; identifying a multi-party computation protocol and parameters of the multi-party computation protocol for performing the computation; and running the computation of the function using the data of the plurality of data sources and in view of the requirements of the user and the constraints of the plurality of data sources.

18 Claims, 5 Drawing Sheets

(51) Int. Cl.
*G06F 16/2455* (2019.01)
*G06F 16/25* (2019.01)
*H04L 9/08* (2006.01)
*G06F 16/2457* (2019.01)

(52) U.S. Cl.
CPC ............ *G06F 16/252* (2019.01); *H04L 9/085* (2013.01); *H04L 2209/46* (2013.01)

(58) Field of Classification Search
USPC .................................. 707/694, 702, 703, 692
See application file for complete search history.

AUTOMATION OF MULTI-PARTY COMPUTATION AS A SERVICE ACCORDING TO USER REGULATIONS AND REQUIREMENTS

BACKGROUND

More and more entities are allowing its data to be used by other users or entities. For example, entities are allowing other entities to use the data to perform machine model training, answering queries, performing computations, and the like. In order to facilitate the use of and access to the data, the entities or data owners are employing service providers. The service providers are connected to data from many different data owners and facilitate the use of the data by other entities. Commonly in providing the data for use to other entities, the service providers aggregate or use data from multiple data owners. For example, if an entity requests a response to a query, the service provider may access data from multiple data owners when providing the response. As another example, if an entity wants to access data to train a machine-learning model, the service provider may aggregate data from multiple data owners and provide the aggregated data to the requesting entity. As a final example, if an entity wants to perform a computation using another's data, the service provider may provide the computation request to multiple data owners who work together to perform the requested computation.

BRIEF SUMMARY

In summary, one aspect of the invention provides a method, including: receiving, at a service provider and from a user, a request for computation of a function, wherein the request includes a description of the function to be computed and requirements of the user with respect to the computation of the function, wherein the requirements comprise security properties, properties of data used within the function, and properties of the function; identifying, at the service provider and from data sources accessible to the service provider, a plurality of data sources to participate in the computation in view of the requirements and the description of the function, wherein each of the plurality of data sources includes data of a data owner and constraints on use of the data; identifying a multi-party computation protocol and parameters of the multi-party computation protocol for performing the computation, wherein the multi-party computation protocol is identified in view of the requirements and description of the function; and running, using the multi-party computation protocol, the computation using the data of the plurality of data sources and in view of the requirements of the user and the constraints of the plurality of data sources.

Another aspect of the invention provides an apparatus, including: at least one processor; and a computer readable storage medium having computer readable program code embodied therewith and executable by the at least one processor; wherein the computer readable program code is configured to receive, at a service provider and from a user, a request for computation of a function, wherein the request includes a description of the function to be computed and requirements of the user with respect to the computation of the function, wherein the requirements comprise security properties, properties of data used within the function, and properties of the function; wherein the computer readable program code is configured to identify, at the service provider and from data sources accessible to the service provider, a plurality of data sources to participate in the computation in view of the requirements and the description of the function, wherein each of the plurality of data sources includes data of a data owner and constraints on use of the data; wherein the computer readable program code is configured to identify a multi-party computation protocol and parameters of the multi-party computation protocol for performing the computation, wherein the multi-party computation protocol is identified in view of the requirements and description of the function; and wherein the computer readable program code is configured to run, using the multi-party computation protocol, the computation using the data of the plurality of data sources and in view of the requirements of the user and the constraints of the plurality of data sources.

An additional aspect of the invention provides a computer program product, including: a computer readable storage medium having computer readable program code embodied therewith, the computer readable program code executable by a processor; wherein the computer readable program code is configured to receive, at a service provider and from a user, a request for computation of a function, wherein the request includes a description of the function to be computed and requirements of the user with respect to the computation of the function, wherein the requirements comprise security properties, properties of data used within the function, and properties of the function; wherein the computer readable program code is configured to identify, at the service provider and from data sources accessible to the service provider, a plurality of data sources to participate in the computation in view of the requirements and the description of the function, wherein each of the plurality of data sources includes data of a data owner and constraints on use of the data; wherein the computer readable program code is configured to identify a multi-party computation protocol and parameters of the multi-party computation protocol for performing the computation, wherein the multi-party computation protocol is identified in view of the requirements and description of the function; and wherein the computer readable program code is configured to run, using the multi-party computation protocol, the computation using the data of the plurality of data sources and in view of the requirements of the user and the constraints of the plurality of data sources.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
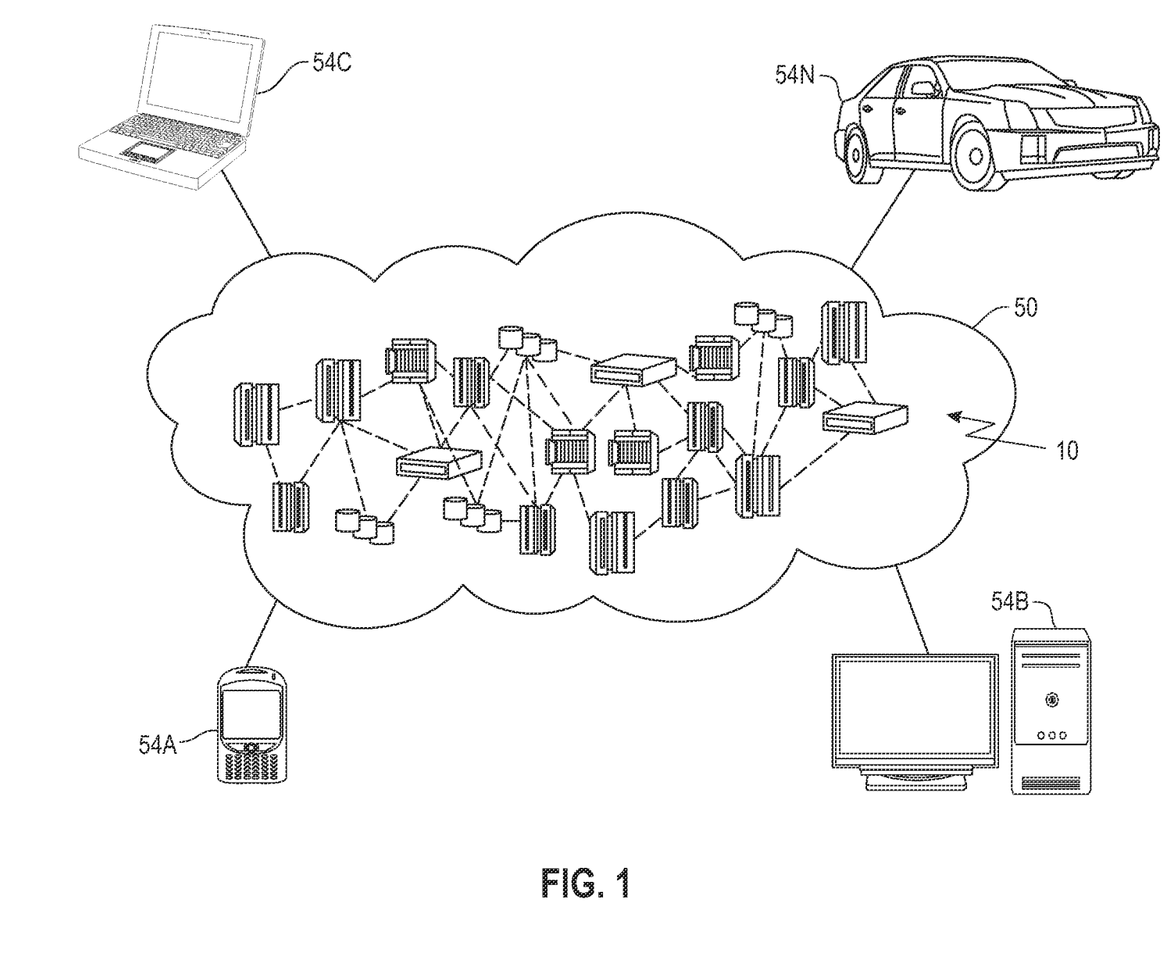
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
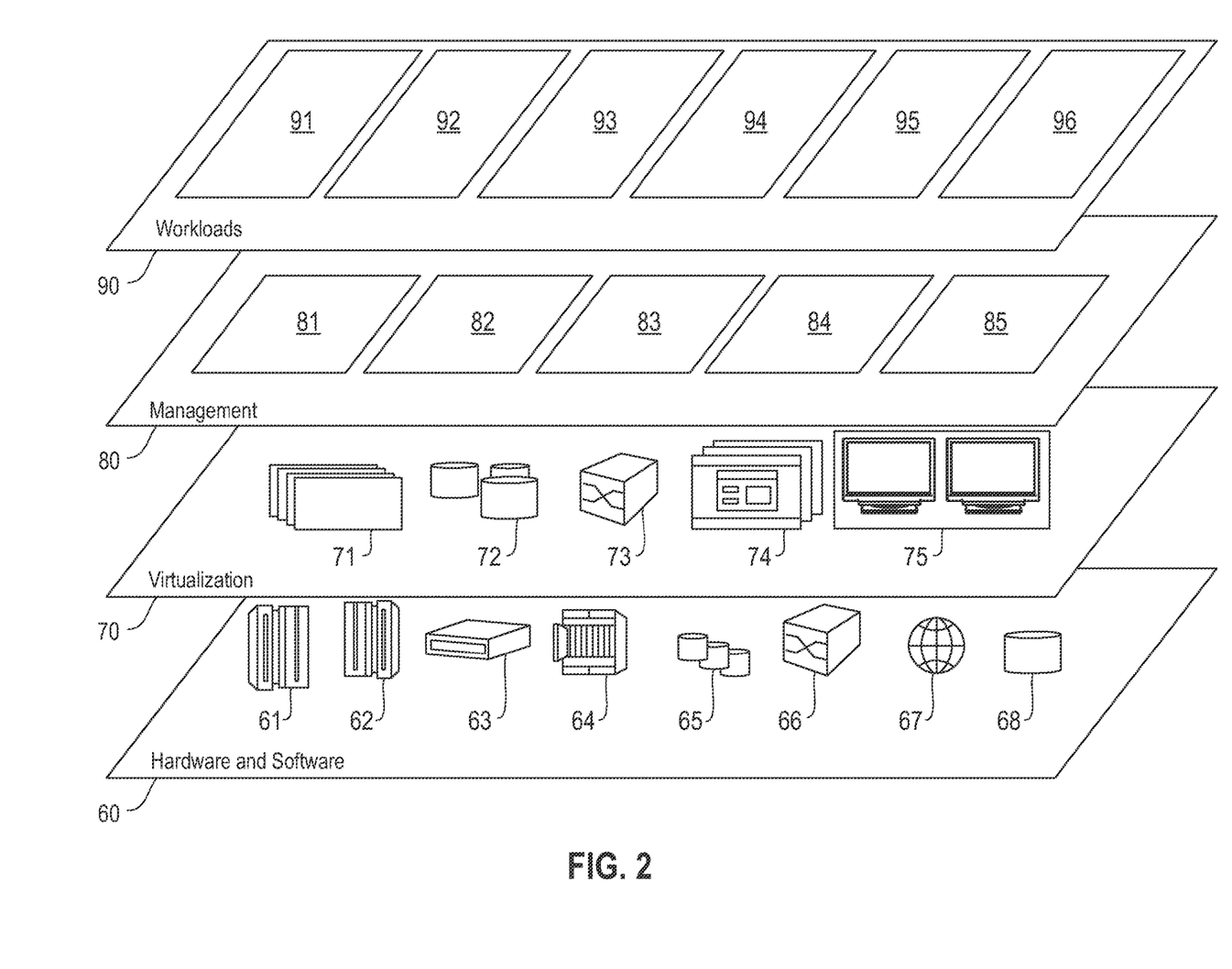
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data hosting and data computation facilitation 96.

The problem with aggregating and using data from multiple data owners is that each data owner may have its own regulations and requirements with respect to its data. For example, one data owner may not have any regulations regarding entities that can use or access the data, whereas another data owner may indicate that only certain entities can use or access the data. These regulations and requirements result in data being segregated, thereby reducing the data that can be used in generating insights, performing calculations, providing responses, and the like.

In performing computations with data from multiple data owners, systems typically employ a secure multi-party computation (MPC). This allows each of the data owners to perform a portion of the computation without sharing data with other data owners. However, an MPC has many different settings and requires user involvement in selecting the MPC protocol and the parameters and settings of the MPC protocol. This becomes very cumbersome as most systems are unable to automatically select these settings and parameters, particularly because the requirements are complex, and there is a lot of technical understanding of the underlying cryptographic protocol required to select the setting, protocol, worker nodes, and the parameters. Additionally, since this requires a large amount of user involvement, each of the data owners has to be intimately involved in performing the requested computation.

Accordingly, an embodiment provides a system and method for automating the identification of a multi-party computation protocol for performing a computation in view of regulations of a requesting user and constraints of data owners participating in the multi-party computation. A service provider receives a request from a user to perform a computation using data of data owners that are accessible to the service provider. The request includes not only a description of the function to be computed but also requirements of the user with respect to the computation of the function, for example, a number of inputs of the function, the type of data to be used in the computation, a number of data sources to be used, and the like.

The service provider identifies a number of data sources that can participate in the computation of the function. The identified data sources include those data sources that fulfill the requirements of the user and that can perform an input of the function. The identified data sources not only include the data of a data owner but also have associated constraints on use of the data, for example, a number of worker nodes that can be used in the computation and the physical locations that they belong to, who their owners are, and other system configurations, requirements on data used from other data sources, what data within the data source is private and what data is public, a type of security to be used in sharing the data, and the like. Once the data sources are identified, the service provider may send a request to the data source asking the data source to be a part of the computation of the function.

The service provider also identifies a multi-party computation protocol and the parameters of that protocol. The protocol and parameters are identified in view of the description of the function and requirements of the user and also in view of the constraints of the data sources that are participating in the computation. Once the protocol and parameters are identified, the service provider runs the computation. Running the computation may include facilitating the running of the computation among the data sources, for example, by acting as an intermediary between the data sources. Running the computation may also include outsourcing the computation performance to one or more worker nodes, which may be automatically identified by the described system. Additionally, the service provider may offer a hosting service. Therefore, running the computation may also include accessing the data on the hosting service and running the computation using resources of the service provider. The results of the computation may then be provided back to the requesting user.

Such a system provides a technical improvement over current systems for MPC performance. The described system and method are able to automate the selection and performance of the MPC while maintaining the enforcement of the regulations and requirements of each of the data owners that are participating in the MPC performance. Since the selection of the MPC protocol and regulation enforcement is done without user involvement, the described system and method is much quicker in performing the computation as compared to conventional systems that must wait to get the user inputs. Additionally, the automated system allows data owners to not be involved in the computation performance while still providing the data owners with assurances that the regulations and requirements of the data owner will be fulfilled and the integrity and privacy of the data will be maintained to the satisfaction of the data owner. Additionally, since the described system and method provides for a data hosting service, the data owners can provide the necessary data to the service without the need to maintain the hardware and software resources necessary for maintaining the data and responding to requests to use the data.

Figure 3:
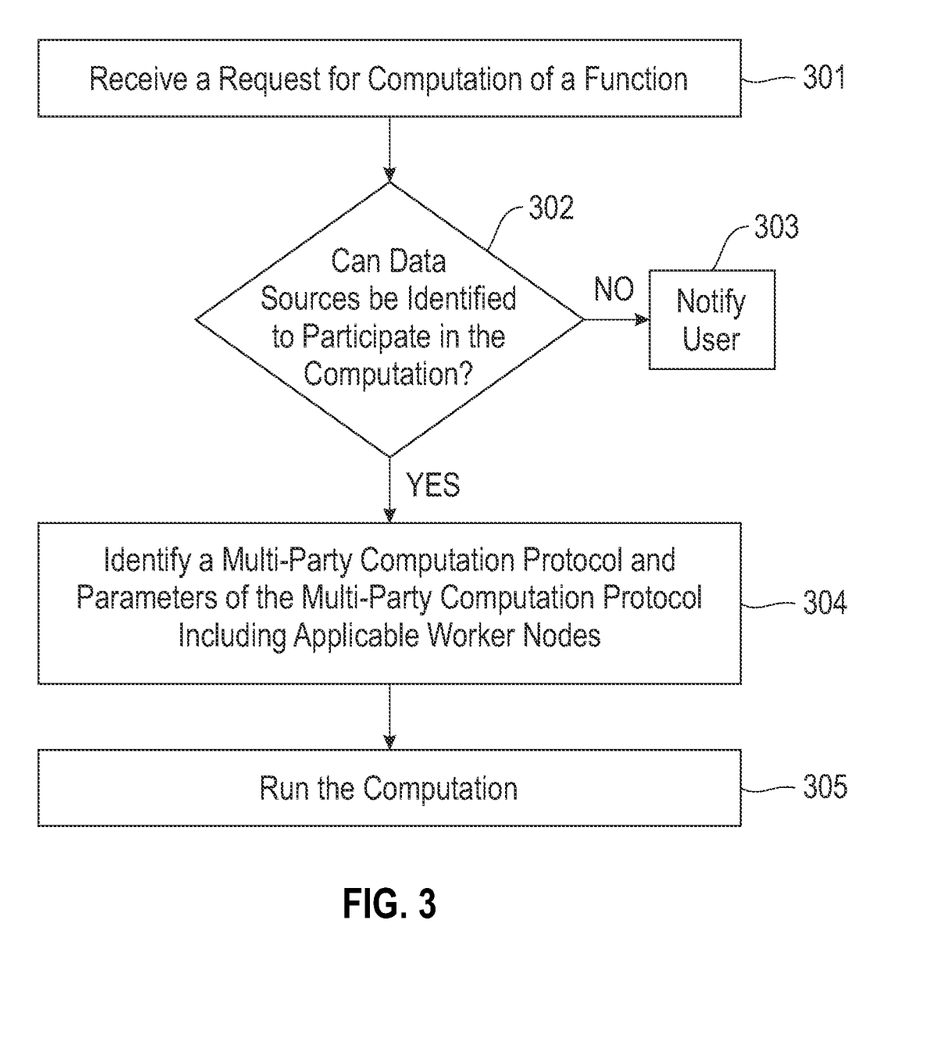
FIG. 3 illustrates a method of automating the identification of a multi-party computation protocol for performing a computation in view of regulations of a requesting user and constraints of data owners participating in the multi-party computation.

FIG. 3 illustrates a method for automating the identification of a multi-party computation protocol for performing a computation in view of regulations of a requesting user and constraints of data owners participating in the multi-party computation. At 301 a service provider may receive a request for computation of a function. The service provider may be a remote (e.g., cloud, remote network, etc.) provider that is an MPC-as-a-service service provider. As a service provider the system may have access to or be connected to a plurality of data sources which each store data of a data owner. For example, a data owner may make its data accessible to the service provider by either connecting the data source to the service provider or hosting the data on the service provider or a platform connected to or accessible by the service provider. The described system also provides a hosting service that can host the data of one or more of the data owners.

The hosting service is a set of hosting server nodes offered by the service provider or platform. The hosting service is untrusted, meaning that the data owners do not trust the hosting service to not learn information about the data hosted on the hosting service. Since the hosting service is an untrusted service, the data is hosted to the hosting service according to all the access control policies of the data source. Since the hosting service is an untrusted entity, the data owner can provide requirements within the access control policy that will limit the hosting service. For example, the access control policy of the data owner may identify a number of collusions, data residency requirements, a total number of hosting nodes, and the like. The access control policies are discussed in more detail herein. Based on these requirements, the service provider chooses a number of server nodes of the hosting service to act as hosts for the data of the data owner during its ingestion. The data is split among the server nodes, thereby reducing the ability of the server nodes to learn information about the data. During ingestion the data is secret-shared among the selected server nodes.

Additionally, the hosting service provides a mechanism to reshare the data hosted on the hosting service. Resharing of the data may occur when the running of the computation is outsourced to a source other than the data owner that owns the data. If the computation performance is outsourced to one or more worker nodes, the hosting service can share the data with the worker nodes so that the data owner does not have to be involved in providing the data to the worker nodes, thereby reducing the user intervention requirements. In other words, the hosting service provides a resharing technique that does not require active involvement of the data owner at all. Additionally, the data may be reshared when the data is rehosted on the hosting service. The data may be rehosted in order to reduce the ability of nodes of the hosting service to learn information about the data. The hosting service periodically chooses a new set of host nodes to host the data of the data owner while still maintaining the access control policy requirements of the data owner. The data may then be reshared with these new set of host nodes. Secret-sharing for resharing may be performed using Shamir's secret sharing protocol.

The request may include a description of the function to be computed and requirements of the user with respect to the computation of the function. The requirements can include any requirements or regulations on the computation and any data owners that may be used in performing the computation. For example, the requirements may identify a number of inputs of the function, a minimum and/or maximum number of data sources that can be used in performing the computation, types of data, times of data, government regulations applicable to the requestor or a data owner, regions of the data, a minimum and/or maximum number of data records to be used from each data source, constraints on the metadata of the data sources, constraints on the input data, a security level of the multi-party computation, and the like. The requirements may change based upon the use case or application of the computation. The system may convert the function description into a predetermined format, for example, arithmetic circuits.

Additionally, the request may include an identification of guarantees that the requesting user wants. For example, the requestor may want guarantees related to an accuracy of the data, a percentage of the data coming from a particular data source type, a privacy of the data, or the like. In other words, the requestor can identify assurances that the service provider will provide in performing the computation and providing a response to the request.

From the requirements the service provider may create an ontology of constraints. The requirements may be provided in a natural language format. For example, the requestor may provide a regulations document that identifies regulations of the requestor. The system may use one or more techniques to convert the natural language into an ontology of constraints. While many different techniques may be used, one non-limiting example includes a module splitting the natural language documents into a sequence of sentences. A module may then identify entity types and relationships between the entities in each of the sentences, for example, using semantic and/or syntactic analysis, information extractors, and the like. Stemming, lemmatization, or the like, can be used to canonicalize entity types and then creating or updating an ontology of constraints with the entity types and entity relationships. This ontology of constraints contains a set of constraint formula triples and is treated as an access control policy of the requestor. Thus, the ontology of constraints may include the constraints in a predetermined format.

The system also generates a MPC access policy format (MAPF) file that identifies the access and computation constraints and relationships between any constraints. The access constraints may identify constraints on the accessing of the data, for example, the type of entity or a specific entity that can access particular data, what data can be accessed by a particular entity or entity type, what data is private data, what data is public data, and the like. Access constraints may differ based upon attributes of the data, for example, public and private data may be subject to different access constraints. Computation constraints may identify constraints on the performance of the computation, for example, the type of entity or a specific entity that can execute one or more portions of the computation, how many entities are required for performing the computation, what portions of the computation that can be shared, what portions of the computation that can be outsourced for performance, and the like.

To generate the MAPF, the system takes the regulations and a knowledge base which identifies entity types. The knowledge base may be generated from the ontology of constraints or an output of a step in generating the ontology of constraints, for example, the output of the entity and relationship identification step performed when generating the ontology of constraints. The system identifies a graph of constraints for each regulation for both the access constraint formula and the computation constraint formula. An ontology with entity types corresponding to access and computation constraints is generated and relationships between the constraints are identified within the ontology. This final ontology is the MAPF.

At 302 the service provider determines if any data sources can be identified to participate in the computation. In other words, the service provider attempts to identify, from the data sources accessible to the service provider, one or more data sources to participate in the computation. This identification is performed in view of the requirements and the description of the function. In other words, when identifying the potential data sources, the service provider identifies data sources that fulfill the requirements and that can actually perform one or more portions or inputs of the function. For example, not all data sources have data that can be used for the performance of the computation.

The identification of the data sources is automatic and does not require any user intervention. Rather, the identification occurs in view of the requirements and constraints of the requestor and also any constraints on the use of the data by the data owner. Like the requestor, each data owner may have its own constraints on the use of its data. These constraints may be converted to access control policies for each data owner. The generation of the access control policies for each data owner may be performed in the same manner as the generation of the access control policy for the requestor. The selection of the data sources can be performed dynamically in view of requirements or the access control policies of the data sources on other participants. For example, if a data source has a requirement that its data can only be used if all the other participants have a certain security level, the service provider can adjust the list of data sources to only include other data sources that have the required security level. Alternatively, if the service provider cannot identify other data sources fulfilling the requirements, the service provider may exclude the data source having the unfulfillable requirement from the list.

To identify the data sources, the system obtains or creates a list of all the data sources that are currently active and the metadata of each of the data sources. The service provider scans through the list of all the data sources and identifies those data sources whose metadata satisfies the constraints for being an input to the function. However, scanning through the list of all data sources may be time consuming and a resource and time extensive process. Therefore, the service provider may employ an indexing technique on the metadata of the data sources to make the scanning faster by using a multi-dimensional indexing technique based on the set of entities in the constraints on the metadata. It should be noted that the searching is performed on the public part of the metadata, with the private part of the metadata possibly being checked later. The MPC protocol takes the computation in the form of a circuit. Thus, this step outputs the circuit for the identified data sources. Additionally, the circuit description and constraints that need to be checked on the private part of the data are provided.

The result is a list of data sources that can participate in the multi-party computation (MPC) for each input in the function. In other words, identifying the data sources may include identifying at least one data source for each input in the function. As stated previously, the requestor or user can specify the number of inputs for the function and the quality and quantity of the data for each of those inputs, so the service provider generates the list in view of these specifications or requirements made by the requestor. The service provider also outputs the computation constraint formula for each data source with respect to the function. The computation constraint formula identifies the constraints with respect to the computation on the data source. The service provider may issue a request to each of the identified data sources to participate in the MPC protocol or computation. If a data sources denies the request, the service provider may, if needed, identify an alternate data source to take the place of the denying data source.

If data sources cannot be identified at 302, the system may notify the user or requestor that the computation cannot be performed at 303. This may occur if no data source fulfills the requirements of the computation, no data source has data that can be used for the computation, or the like. On the other hand, if data sources for each input can be identified at 302, the service provider may identify a multi-party computation protocol and parameters of that protocol to be used in performing the computation at 304. Identification of the protocol and parameters is performed in view of the requestor requirements and the description of the function. Additionally, the service provider may take into account constraints of the data owners. In other words, the identification of the protocol and parameters is done in view of the access control policies of the requestor and the data owners involved in the computation.

To identify the protocol and the parameters of the protocol, the service provider may determine whether any worker nodes will be involved in performing the computation. Worker nodes can help data owners perform the computation, which reduces the processing, time, and other resources required to be provided by the data owner in order to perform the computation. However, worker nodes are not trusted, meaning it is assumed that the worker nodes are attempting to learn information about the data, regardless of the actual intentions of the worker nodes. The worker nodes, while not trusted, can perform the computation while satisfying any constraints of the data owner and/or requestor. In other words, the worker nodes perform the computation in view of the access control policies of the data owners and/or requestor. Worker nodes may be servers, for example, cloud servers, that can perform the desired processing and computation.

If worker nodes are utilized, the data of the data owner will be secret-shared with the worker nodes. The data owner can have its own constraints on how many worker nodes can be used, how many worker nodes can be adversarial, how many worker nodes can be used by other data sources included in the computation performance, the geography of the worker nodes, and the like. In other words, the data owner, and even the requestor, can place constraints on the use of worker nodes. To identify worker nodes, the service provider identifies a list of all available worker nodes the satisfy the constraints of all participating data sources. In identifying whether a worker node satisfies the constraints, the service provider may search the metadata of the worker node, for example, in the same manner that the service provider searched the metadata of the data sources. In the event that worker nodes cannot be identified that satisfy all the constraints of the data sources, the service provider may suggest an alternate set of data sources.

To identify the MPC protocol and parameters, the service provider takes a list of the data sources that are being used to perform an input of the computation and the metadata of the selected data sources. The service provider also identifies the number of data sources that are input from each class for the function. A class is a type of data source for each input in the function. In other words, each data source may have data of a different type, which is a class. As an example, if there are six data sources that have been identified for one input of the function and three of the data sources are of one type and three of the data sources are of another type, there are considered to have two classes of data sources. The types of classes or required number of classes may be defined by the requestor in the request. The service provider also receives the computation constraint formula (CCF) for the function.

From this information and in view of the access control policies of the requestor and participating data sources, the service provider can select an MPC protocol which identifies how the computation is to be performed. First the service provider identifies a premise of the MPC protocol. The premise identifies how honest the worker nodes or other computation performers (e.g., the data owners, servers of the data owners, other service providers selected by the data owners, etc.) have to be when performing the computation. Some honesty options include all of the computation performers being honest, a majority being honest, none being honest, a particular percentage or number being honest, or the like. An honest majority MPC is generally the most efficient protocol premise and will be used as the example in order to increase readability. However, the use of this example is not intended to limit the scope of this disclosure to only this protocol premise.

At a high level, the service provider first attempts to obtain a computation performer configuration and input data source set that supports the honest-majority MPC. If the entire computation cannot be performed on an honest-majority MPC, the service provider attempts to run partitions on the honest-majority MPC. Those partitions or regions that cannot be run on the honest-majority MPC will be run on a dishonest-majority MPC. The protocol may first be identified based upon a single constraint, for example, a region constraint which identifies what regions the data of the data sources is applicable for. Once the protocol is identified for this first constraint, it may be fine-tuned or augmented based upon other constraints, for example, tenant-access constraints, trusted execution environment constraints, and the like. It should be noted that the region constraints being the first constraint or the other constraints mentioned are merely examples and other constraints could be the primary constraints or taken into account when making the protocol.

More details regarding how the MPC protocol and parameters are chosen follow. Additionally, this discussion provides details on how the computation of the function may be run using the multi-party computation protocol using the data of the data sources in view of the requirements of the user and the constraints of the data sources at 305. In this protocol identification and computation performance, the access control policies may be taken into account. For example, the protocol may take into account a number of collusions, data residency requirements, forbidden region requirements, and the like. The number of collusions may be referred to as a corruption threshold and may identify a minimum number of worker nodes (or computation performers) (t) among a total number of performers (n) that need to collude to get back to the plaintext data. These may be expressed as a predicate(t,n): True/False. The predicates are piecewise linear in t and n. Data residency requirements may be the number of worker nodes outside the region should be below the corruption threshold. The forbidden regions are a union of worker nodes from forbidden regions that should be below the corruption threshold.

An honest-majority MPC is possible if participating data sources having data residency requirements are from the same region. An honest-majority MPC is also possible if the participating data sources do not have contradictory data residency requirements and prohibited or forbidden regions. For example, if a data source from one country has a data residency requirement and another data source from another country does not have a data residency requirement but has the first country as a forbidden region, these data sources cannot be used together in the computation performance.

The service provider finds a feasible region for the computation performers based upon the constraints of all the participating data sources. For example, the service provider may find the lowest number of computation performers in the feasible region when the number of computation performers needed to collude is less than the half of the total number of computation performers. If this is not possible, then the service provider chooses a "full-threshold" MPC protocol and choose the total number of computation performers to be the maximum of the number of collusions that the participating data sources require. To make this process more efficient, the service provider may run a partitioned MPC computation to maximize the execution of honest-majority MPC.

A partition is a portion of the function. The function may be partitioned into local computations and global computations. Each local computation involves data sources with the same region requirements (either through matching data residency or forbidden region requirements). The rest of the computation is marked as a global computation. As previously mentioned, the computation may be represented as a computation circuit. In order to assist in the running of the computation, the service provider may mark or label each wire in the computation circuit with the allowed and forbidden regions.

For the local computation partitions between data sources having the same region requirements, the service provider may find a feasible range for the total number of computation performers (n) and number of computation performers needed to collude (t) based on the constraints of the data sources included in the local computation. The service provider may find the lowest (n) in the feasible region with $t<=n/2$ if possible. If such a region does not exist, the service provider may re-perform these steps with a set of substitute or alternate data sources to find a (t,n) such that $t<n/2$. If this is not possible, the service provider may find the lowest (n) among the iterations and let $t=n-1$. Worker nodes may then be chosen for this local computation. The MPC circuit of this local computation is replaced with its differentially private equivalent. The cost of the MPC can also be included in this optimization.

For the global computations, the premise is there are no region constraints, either data residency or forbidden region requirements, on the outputs of the local computation. The data residency requirements typically allow the release of aggregates that do not reveal information on an individual data point. Using differential privacy provides this guarantee by hiding the individual data points. Thus, for the global computation the service provider takes the optimal (t,n) from all participating data sources. The service provider retains the collusion restrictions for the global computation even with differential privacy. The service provider then chooses (n) worker nodes (or computation performers), called a global worker node set. Each set of local worker nodes (or computation performers) reshare its results to those in the global worker node set. The global worker node set runes a (t,n)—MPC on the global computation.

Figure 4:
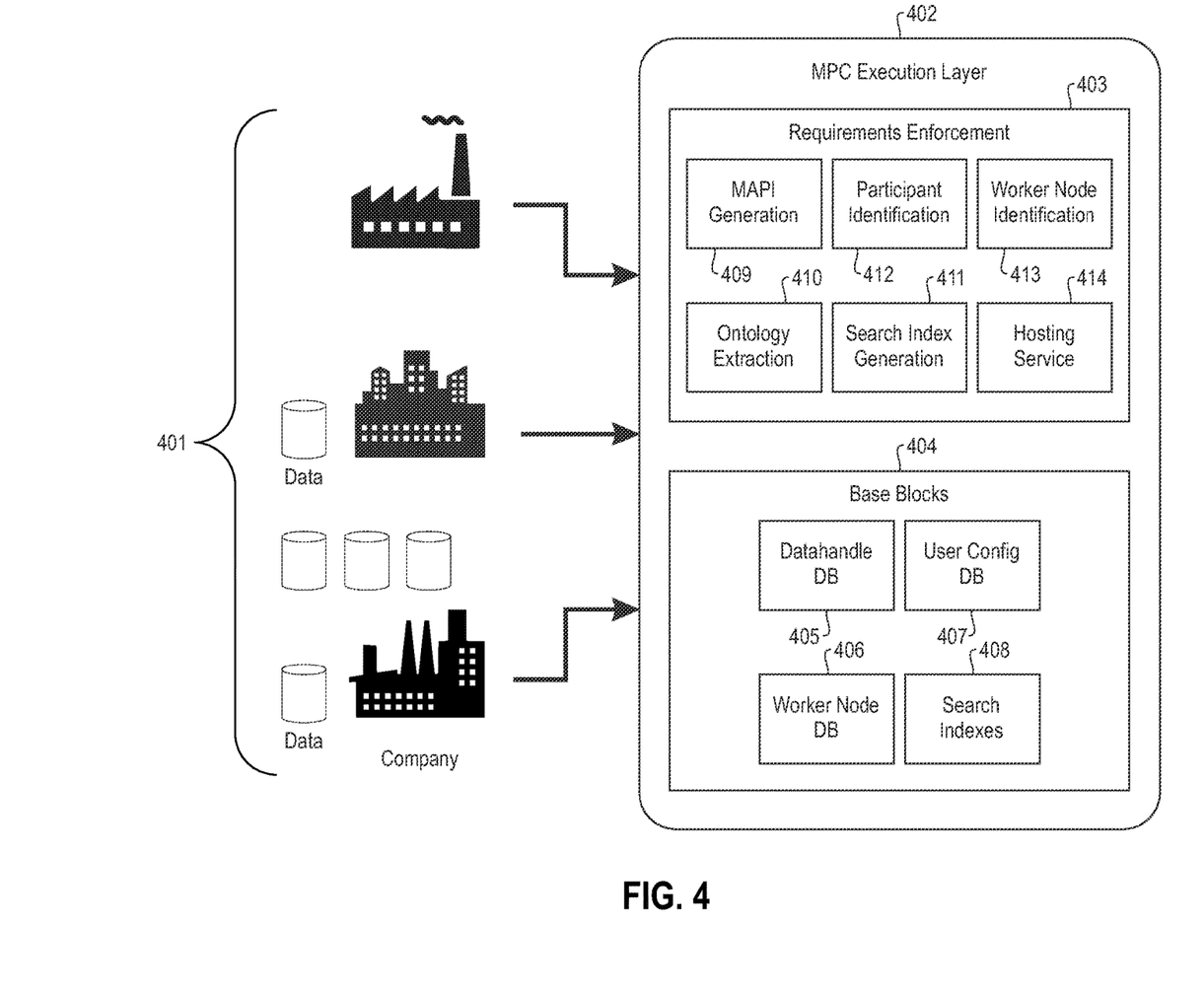
FIG. 4 illustrates an example overall system architecture for automating the identification of a multi-party computation protocol for performing a computation in view of regulations of a requesting user and constraints of data owners participating in the multi-party computation.

FIG. 4 illustrates an overall example of a system architecture for automating the identification of a multi-party computation protocol for performing a computation in view of regulations of a requesting user and constraints of data owners participating in the multi-party computation. Different companies or entities 401 have its own data but want to do a common computation while satisfying their own regulations and requirements. In the MPC execution layer 402 are two sets of modules that assist in automating the use of the MPC execution layer 402, the requirements enforcement modules 403 and the base blocks 404. The base blocks 404 include a datahandle database 405. The term "datahandle" is also referred to as "data source" herein. Thus, the datahandle database 405 includes a listing of all possible data sources and metadata of the data sources. The worker node database 406 includes a listing of all possible worker nodes and metadata of the worker nodes. The user configuration database 407 includes the configuration of the system. The search index 408 includes an index that allows for faster searching of the data sources and/or worker nodes by the service provider.

The MAPF generation block 409 is used to generate the access control policies. The ontology extraction block 410 generates ontologies from the requirements and regulations and containing the constraints. The search index generation block 411 generates the search index for the requirements and regulations. The participant identification block 412 identifies participants or data sources based upon the requirements of the requesting user and also in view of requirements of participants on other participants. The worker node identification block 413 performs dynamic identification of worker nodes or other computation performers based upon the regulations and constraints of the requestor and other data sources. The hosting service 414 provides a service for hosting data of data owners and resharing data of the data owners in order to facilitate performance of the computation.

Thus, the described system and method provides automatic cryptographic enforcement of regulations and business requirements in a remote multiparty computation-as-a-service. Additionally, the system and method automate the selection of the worker nodes that perform the computation if performance of the computation has been outsourced from the data owner. Since the system is able to automatically select data sources to be used in the computation or protocol, the system can dynamically set the participants based upon requirements of other participants. The system also automates the selection of the secure MPC protocol and parameters to be used within the protocol, for example, the security level of the protocol, the data to be used within the protocol, the number of servers to be used in the protocol, and the like. The automatic selection of worker nodes, if applicable, the MPC protocol, parameters of the protocol, data sources to be used in the protocol, and the like, are all performed according to regulator and business requirements of all participants and the requestor. Additionally, the described system and method provides a hosting service that provides hosting of data of data owners that is secure in view of the regulations and requirements of the data owner.

Figure 5:
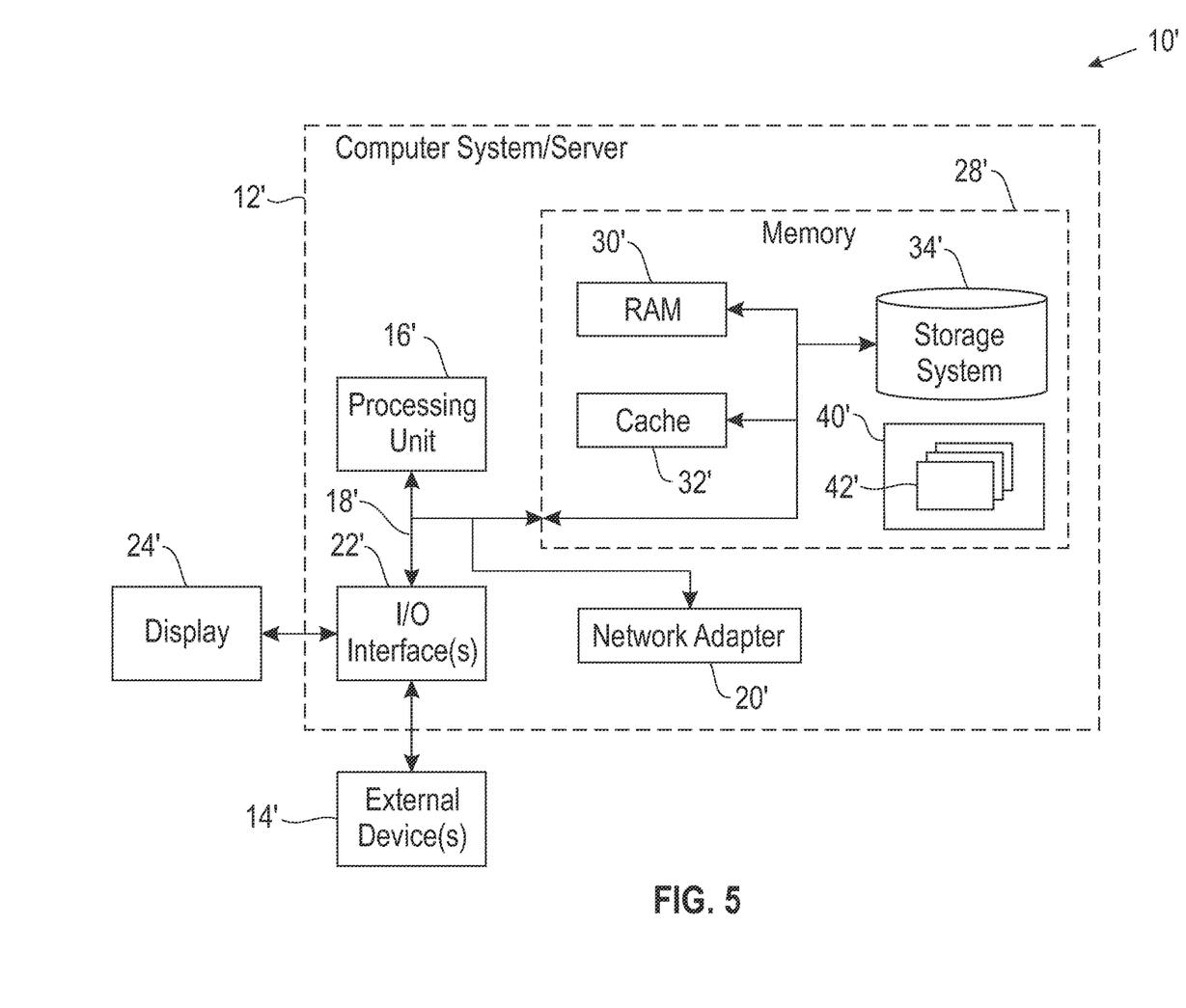
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving, at a service provider and from a user, a request for computation of a function, wherein the request comprises a description of the function to be computed and requirements of the user with respect to the computation of the function, wherein the requirements comprise security properties, properties of data used within the function, and properties of the function, wherein the computation utilizes data from a plurality of data owners, wherein each of the plurality of data owners performs a portion of the computation, wherein the service provider comprises a security function providing identity verification for cloud consumers and tasks and protection for data and other resources;
    accessing, at the service provider, a list of data sources available to perform computations and metadata of each of the data sources, wherein each of the data sources comprises data of a data owner and constraints by the data owner on use of the data, wherein the list of data sources is indexed on the metadata using a multi-dimensional indexing technique based upon the constraints, wherein the constraints are converted to access control policies for each data owner;
    identifying automatically without user intervention, at the service provider and from data sources accessible to the service provider, a plurality of data sources to participate in the computation in view of the requirements and the description of the function, wherein the identifying comprises scanning the index of the list of data sources and identifying, from the metadata of the data sources, data sources fulfilling the requirements in view of the constraints of the data owner on the use of the data corresponding to a given of the data sources, wherein the identifying the plurality of data sources comprises determining that metadata of the plurality of data sources fulfills the requirements of the user and other function constraints by searching metadata of each of the plurality of data sources;
    identifying a multi-party computation protocol and parameters of the multi-party computation protocol for performing the computation, wherein the multi-party computation protocol is identified in view of the requirements and description of the function; and
    running, using the multi-party computation protocol, the computation using the data of the plurality of data sources and in view of the requirements of the user and the constraints of the plurality of data sources.

2. The method of claim 1, comprising sending a request to each of the plurality of data sources to participate in the computation.

3. The method of claim 1, wherein the metadata comprises a public portion and a private portion.

4. The method of claim 1, comprising identifying, in view of the requirements of the user, the constraints of the data owner corresponding to each of the plurality of data sources, and regulatory requirements, a plurality of worker nodes to perform the computation on behalf of the plurality of data sources.

5. The method of claim 4, wherein utilizing the plurality of worker nodes to perform the computation comprises secret-sharing the data with the plurality of worker nodes.

6. The method of claim 1, wherein the data of at least one of the plurality of data owners is hosted at a hosting service of the service provider;

wherein the hosting service is untrusted and comprises a plurality of hosting nodes;
wherein the data is secret-shared among the hosting nodes during the computation; and
wherein the hosting service enables the data hosted at the hosting service to be provided as input in a secure way to the multi-party computation protocol in a manner satisfying the requirements.

7. The method of claim 1, wherein the running comprises partitioning the function into partitions and running the partitions in view of the requirements of the user and the constraints of the plurality of data sources.

8. The method of claim 1, wherein the request identifies a number of inputs in the function and wherein the identifying a plurality of data sources comprises identifying at least one data source for each of the inputs in the function.

9. The method of claim 1, comprising generating, from the requirements of the user, an ontology of constraints in a predetermined format.

10. An apparatus, comprising:
at least one processor; and
a computer readable storage medium having computer readable program code embodied therewith and executable by the at least one processor;
wherein the computer readable program code is configured to receive, at a service provider and from a user, a request for computation of a function, wherein the request comprises a description of the function to be computed and requirements of the user with respect to the computation of the function, wherein the requirements comprise security properties, properties of data used within the function, and properties of the function, wherein the computation utilizes data from a plurality of data owners, wherein each of the plurality of data owners performs a portion of the computation, wherein the service provider comprises a security function providing identity verification for cloud consumers and tasks and protection for data and other resources;
wherein the computer readable program code is configured to access, at the service provider, a list of data sources available to perform computations and metadata of each of the data sources, wherein each of the data sources comprises data of a data owner and constraints by the data owner on use of the data, wherein the list of data sources is indexed on the metadata using a multi-dimensional indexing technique based upon the constraints, wherein the constraints are converted to access control policies for each data owner;
wherein the computer readable program code is configured to identify automatically without user intervention, at the service provider and from data sources accessible to the service provider, a plurality of data sources to participate in the computation in view of the requirements and the description of the function, wherein the identifying comprises scanning the index of the list of data sources and identifying, from the metadata of the data sources, data sources fulfilling the requirements in view of the constraints of the data owner on the use of the data corresponding to a given of the data sources, wherein the identifying the plurality of data sources comprises determining that metadata of the plurality of data sources fulfills the requirements of the user and other function constraints by searching metadata of each of the plurality of data sources;
wherein the computer readable program code is configured to identify a multi-party computation protocol and parameters of the multi-party computation protocol for performing the computation, wherein the multi-party computation protocol is identified in view of the requirements and description of the function; and
wherein the computer readable program code is configured to run, using the multi-party computation protocol, the computation using the data of the plurality of data sources and in view of the requirements of the user and the constraints of the plurality of data sources.

11. A computer program product, comprising:
a computer readable storage medium having computer readable program code embodied therewith, the computer readable program code executable by a processor;
wherein the computer readable program code is configured to receive, at a service provider and from a user, a request for computation of a function, wherein the request comprises a description of the function to be computed and requirements of the user with respect to the computation of the function, wherein the requirements comprise security properties, properties of data used within the function, and properties of the function, wherein the computation utilizes data from a plurality of data owners, wherein each of the plurality of data owners performs a portion of the computation, wherein the service provider comprises a security function providing identity verification for cloud consumers and tasks and protection for data and other resources;
wherein the computer readable program code is configured to access, at the service provider, a list of data sources available to perform computations and metadata of each of the data sources, wherein each of the data sources comprises data of a data owner and constraints by the data owner on use of the data, wherein the list of data sources is indexed on the metadata using a multi-dimensional indexing technique based upon the constraints, wherein the constraints are converted to access control policies for each data owner;
wherein the computer readable program code is configured to identify automatically without user intervention, at the service provider and from data sources accessible to the service provider, a plurality of data sources to participate in the computation in view of the requirements and the description of the function, wherein the identifying comprises scanning the index of the list of data sources and identifying, from the metadata of the data sources, data sources fulfilling the requirements in view of the constraints of the data owner on the use of the data corresponding to a given of the data sources, wherein the identifying the plurality of data sources comprises determining that metadata of the plurality of data sources fulfills the requirements of the user and other function constraints by searching metadata of each of the plurality of data sources;
wherein the computer readable program code is configured to identify a multi-party computation protocol and parameters of the multi-party computation protocol for performing the computation, wherein the multi-party computation protocol is identified in view of the requirements and description of the function; and
wherein the computer readable program code is configured to run, using the multi-party computation protocol, the computation using the data of the plurality of data sources and in view of the requirements of the user and the constraints of the plurality of data sources.

12. The computer program product of claim 11, comprising sending a request to each of the plurality of data sources to participate in the computation.

13. The computer program product of claim 11, comprising identifying, in view of the requirements of the user, the constraints of the data owner corresponding to each of the plurality of data sources, and regulatory requirements, a plurality of worker nodes to perform the computation on behalf of the plurality of data sources.

14. The computer program product of claim 13, wherein utilizing the plurality of worker nodes to perform the computation comprises secret-sharing the data with the plurality of worker nodes.

15. The computer program product of claim 11, wherein the data of at least one of the plurality of data owners is hosted at a hosting service of the service provider;
   wherein the hosting service is untrusted and comprises a plurality of hosting nodes;
   wherein the data is secret-shared among the hosting nodes during the computation; and
   wherein the hosting service enables the data hosted at the hosting service to be provided as input in a secure way to the multi-party computation protocol in a manner satisfying the requirements.

16. The computer program product of claim 11, wherein the running comprises partitioning the function into partitions and running the partitions in view of the requirements of the user and the constraints of the plurality of data sources.

17. The computer program product of claim 11, wherein the request identifies a number of inputs in the function and wherein the identifying a plurality of data sources comprises identifying at least one data source for each of the inputs in the function.

18. The computer program product of claim 11, comprising generating, from the requirements of the user, an ontology of constraints in a predetermined format.

* * * * *